(12) United States Patent
Naserian et al.

(10) Patent No.: US 12,725,523 B1
(45) Date of Patent: Sep. 1, 2026

(54) VULNERABLE ROAD USER WARNING SYSTEM FOR A VEHICLE

(71) Applicant: GM Global Technology Operations LLC, Detroit, MI (US)

(72) Inventors: Mohammad Naserian, Rochester Hills, MI (US); Vivek Vijaya Kumar, Shelby Township, MI (US); Hariharan Krishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/085,369

(22) Filed: Mar. 20, 2025

(51) Int. Cl.
*G08G 1/16* (2006.01)
*B60W 30/095* (2012.01)
(Continued)

(52) U.S. Cl.
CPC ......... *G08G 1/166* (2013.01); *B60W 30/0956* (2013.01); *B60W 40/04* (2013.01); *B60W 60/0015* (2020.02); *G08G 1/096725* (2013.01); *B60W 2554/4041* (2020.02); *B60W 2554/4044* (2020.02); *B60W 2554/801* (2020.02); *B60W 2556/45* (2020.02)

(58) Field of Classification Search
CPC ............ G08G 1/166; G08G 1/096725; B60W 30/0956; B60W 40/04; B60W 60/0015; B60W 2554/4041; B60W 2554/4044; B60W 2554/801; B60W 2556/45
USPC ........................................................ 701/1, 26
See application file for complete search history.

(56) References Cited

U.S. PATENT DOCUMENTS 7,831,407 B2 * 11/2010 Huang .................. B60W 40/09 701/72
9,598,009 B2 * 3/2017 Christensen ........... B60Q 9/008
(Continued)

FOREIGN PATENT DOCUMENTS

DE 102013017626 A1 4/2015
DE 102016015003 A1 6/2017
(Continued)

OTHER PUBLICATIONS

De Borba et al; Increasing Safety of Vulnerable Road Users in Scenarios With Occlusion: A Collaborative Approach for Smart Infrastructures and Automated Vehicles; 2025; IEEE Access; IEEE Vehicular Technology Society Section; Digital Object Identifier 10.1109/ACCESS.2025.3527865; vol. 13, 2025 (Year: 2025).*
(Continued)

*Primary Examiner* — Jaime Figueroa
(74) *Attorney, Agent, or Firm* — Vivacqua Crane, PLLC

(57) ABSTRACT

A vulnerable road user warning system for a vehicle includes one or more controllers that receive wireless signals from a communication network indicating the location, speed, and trajectory of a vulnerable road user located in an environment surrounding the vehicle. The one or more controllers include one or more processors that execute instructions to determine potential imminent contact between the vulnerable road user and the vehicle based on the wireless signals. In response to determining the potential imminent contact exists between the vulnerable road user and the vehicle, the one or more controllers instruct the vehicle to execute one or more preventative actions to avoid contact between the vehicle and the vulnerable road user.

20 Claims, 8 Drawing Sheets

(51) Int. Cl.

| | |
|---|---|
| ***B60W 40/04*** | (2006.01) |
| ***B60W 60/00*** | (2020.01) |
| ***G08G 1/0967*** | (2006.01) |

(56) References Cited

U.S. PATENT DOCUMENTS

| | | | | |
|---|---|---|---|---|
| 10,235,882 | B1 * | 3/2019 | Aoude | G08G 1/005 |
| 11,396,271 | B2 * | 7/2022 | Kourous-Harrigan | B60R 21/34 |
| 11,776,396 | B2 * | 10/2023 | Malhan | G06T 1/20 701/3 |
| 12,469,388 | B2 * | 11/2025 | Ramamurthy | G08G 1/096783 |
| 12,509,071 | B2 * | 12/2025 | Sharma Banjade | B60W 30/0956 |
| 2010/0023180 | A1 * | 1/2010 | Huang | B60W 30/12 701/1 |
| 2010/0023296 | A1 * | 1/2010 | Huang | B60W 40/09 702/141 |
| 2010/0209885 | A1 * | 8/2010 | Chin | G09B 19/167 434/66 |
| 2017/0008454 | A1 * | 1/2017 | Christensen | G08G 1/163 |
| 2017/0182940 | A1 * | 6/2017 | Christensen | B60Q 9/008 |
| 2021/0183244 | A1 * | 6/2021 | Malhan | G06T 1/20 |
| 2021/0394705 | A1 * | 12/2021 | Kourous-Harrigan | G06T 19/006 |
| 2022/0161818 | A1 * | 5/2022 | Solmaz | G08G 1/096725 |
| 2022/0388505 | A1 * | 12/2022 | Sharma Banjade | B60W 30/0956 |
| 2023/0282112 | A1 * | 9/2023 | James | G08G 1/056 340/436 |
| 2023/0316912 | A1 * | 10/2023 | Ramamurthy | G08G 1/096783 701/119 |
| 2023/0316921 | A1 * | 10/2023 | Ramamurthy | G08G 1/166 701/117 |
| 2024/0177611 | A1 * | 5/2024 | Lee | B60W 50/14 |
| 2026/0120572 | A1 * | 4/2026 | Das | G08G 1/166 |

FOREIGN PATENT DOCUMENTS

| | | | |
|---|---|---|---|
| DE | 102017207968 | A1 | 6/2018 |
| DE | 102020213456 | A1 | 6/2022 |

OTHER PUBLICATIONS

Pasch et al; Vulnerable Road Users in Structured Environments with Responsibility-Sensitive Safety; 2021 IEEE Intelligent Transportation Systems Conference (ITSC) Indianapolis, USA. Sep. 19-21, 2021 (Year: 2021).*

Vourgidis et al; Use Of Smartphones for Ensuring Vulnerable Road User Safety through Path Prediction and Early Warning: An In-Depth Review of Capabilities, Limitations and Their Applications in Cooperative; 2020; Sensors MDPI; Sensors 2020, 20, 997; doi:10.3390/s20040997 (Year: 2020).*

* cited by examiner

VULNERABLE ROAD USER WARNING SYSTEM FOR A VEHICLE

INTRODUCTION

The present disclosure relates to a vulnerable road user warning system for a vehicle that receives wireless signals over a communication network, where the wireless signals indicate the position, speed, and trajectory of a vulnerable road user located in an environment surrounding the vehicle.

A vehicle may include perception sensors such as, for example, cameras, radar, and LiDAR for collecting perception data indicative of the environment surrounding the vehicle. One specific type of object that may be located in the environment surrounding the vehicle is a vulnerable road user. Some examples of vulnerable road users include pedestrians, cyclists, and road workers.

Sometimes objects located in the surrounding environment may not be seen or detected by the perception sensors for a variety of different reasons. One reason a vulnerable road user may not be seen or detected by a vehicle's perception sensors is because of low-light or adverse weather conditions such as heavy rain, snow, and fog. Specifically, low-light and adverse weather conditions may lead to reduced visibility, which hinders a camera's ability to capture clear images of the environment. Furthermore, objects located in the surrounding environment may occlude the line-of-sight between a vulnerable road user and a perception sensor. As an example, a bus or other vehicle located in the surrounding environment may occlude the line-of-sight between a pedestrian and a host vehicle's camera. It is also to be appreciated that sometimes the field-of-view of a perception sensor may be limited. As a result, a camera or other perception sensor may only capture a portion of a scene, potentially missing relevant objects that are located along the sides or periphery of the scene.

Thus, while current perception sensors achieve their intended purpose, there is a need in the art for an improved approach for detecting and classifying the location of a vulnerable road user with respect to a vehicle.

SUMMARY

According to several aspects, a vulnerable road user warning system for a vehicle is disclosed. The vulnerable road user warning system includes one or more controllers that receive wireless signals from a communication network indicating the location, speed, and trajectory of a vulnerable road user located in an environment surrounding the vehicle. The one or more controllers include one or more processors that execute instructions to determine the vehicle is either making a turn or maintaining a straight trajectory based on a path prediction radius of the vehicle. In response to determining the vehicle is maintaining the straight trajectory, the one or more controllers determine a position and speed of the vulnerable road user based on the wireless signals. The one or more controllers calculate a relative heading angle between the vulnerable road user and the vehicle. The one or more controllers compare the relative heading angle with a lower limit threshold heading angle and an upper limit threshold heading angle. In response to determining the relative heading angle is greater than the lower limit threshold heading angle and less than the upper limit threshold heading angle, the one or more controllers determine a potential intersection exists between the vehicle and the vulnerable road user. In response to determining a potential intersection exists between the vehicle and the vulnerable road user, the one or more controllers compare a position of the vulnerable road user with a lateral distance threshold value and a stopping distance of the vehicle. In response to determining the position of the vulnerable road user intersects with the lateral distance threshold value and the stopping distance of the vehicle, the one or more controllers determine a conflict box. In response to determining the distance measured between the front of the vehicle and a closest side of the conflict box is less than the stopping distance of the vehicle, the one or more controllers determine potential imminent contact exists between the vulnerable road user and the vehicle, and in response to determining the potential imminent contact exists between the vulnerable road user and the vehicle, the one or more controllers instruct the vehicle to execute one or more preventative actions to avoid contact between the vehicle and the vulnerable road user.

In another aspect, the one or more preventative actions include instructing an autonomous driving system to change a trajectory of the vehicle to avoid contacting the vulnerable road user.

In yet another aspect, the conflict box is determined based on a predicted point of intersection between the vulnerable road user and the vehicle.

In an aspect, the predicted point of intersection is calculated based on a predicted trajectory of the vehicle and a predicted trajectory of the vulnerable user.

In another aspect, the conflict box includes four sides of equal length that create a square, and where the predicted point of intersection is located at a center of the conflict box.

In yet another aspect, the longitudinal sides of the conflict box are lengthened as a function of the speed of the vehicle.

In an aspect, lateral sides of the conflict box are lengthened as a function of the speed of the vulnerable road user.

In another aspect, the lateral distance threshold value is the sum of a left lateral distance threshold, a right lateral distance threshold, a left width buffer distance, and a right width buffer distance.

In yet another aspect, the left lateral distance threshold is determined based on a lane width of a lane the vehicle is traveling along and a left lane multiplier, and the right lateral distance threshold is determined based on the lane width of the lane and a right lane multiplier.

In an aspect, the left lateral distance threshold is greater than the right lateral distance threshold.

In another aspect, the path prediction radius is measured from a center of a circular predicted path that the vehicle follows while executing the turn.

In yet another aspect, the one or more controllers execute instructions to in response to determining the vehicle is making a turn, compare the position of the vulnerable road user with the lateral distance threshold value and the stopping distance of the vehicle, where the lateral distance threshold value is centered along the circular predicted path that the vehicle follows.

In an aspect, the one or more controllers execute instructions to in response to determining the stopping distance of the vehicle is less than or equal to the position of the vulnerable road user and the position of the vulnerable road user falls within the lateral distance threshold value centered along the circular predicted path, determine the potential imminent contact exists between the vulnerable road user and the vehicle.

In another aspect, the one or more controllers execute instructions to instruct an autonomous driving system to delay launching the vehicle from a stop at an immediate intersection where a traffic signal controller is located based on the wireless signals received from the communication network, where the wireless signals include information regarding the traffic signal controller and geometric data regarding an intersection where the traffic signal controller is located that are part of.

In yet another aspect, the communication network is based on the vehicle-to-everything (V2X) communication protocol.

In an aspect, a method for determining potential imminent contact between a vulnerable road user and a vehicle. The method includes determining, by one or more controllers, the vehicle is either making a turn or maintaining a straight trajectory based on a path prediction radius of the vehicle, where the one or more controllers receive wireless signals from a communication network indicating a location, speed, and trajectory of a vulnerable road user located in an environment surrounding the vehicle. In response to determining the vehicle is maintaining the straight trajectory, the method includes determining a position and speed of the vulnerable road user based on the wireless signals. The method includes calculating a relative heading angle between the vulnerable road user and the vehicle. The method includes comparing the relative heading angle with a lower limit threshold heading angle and an upper limit threshold heading angle. In response to determining the relative heading angle is greater than the lower limit threshold heading angle and less than the upper limit threshold heading angle, the method includes determining a potential intersection exists between the vehicle and the vulnerable road user. In response to determining a potential intersection exists between the vehicle and the vulnerable road user, the method includes comparing a position of the vulnerable road user with a lateral distance threshold value and a stopping distance of the vehicle. In response to determining the position of the vulnerable road user intersects with the lateral distance threshold value and the stopping distance of the vehicle, the method includes determining a conflict box. In response to determining a distance measured between the front of the vehicle and a closest side of the conflict box is less than the stopping distance of the vehicle, the method includes determining the potential imminent contact exists between the vulnerable road user and the vehicle. In response to determining the potential imminent contact exists between the vulnerable road user and the vehicle, the method includes instructing the vehicle to execute one or more preventative actions to avoid contact between the vehicle and the vulnerable road user.

In another aspect, a vulnerable road user warning system for a vehicle is disclosed. The vulnerable road user warning system includes one or more controllers that receive wireless signals from a communication network indicating the location, speed, and trajectory of a vulnerable road user located in an environment surrounding the vehicle. The one or more controllers include one or more processors that execute instructions to determine the vehicle is either making a turn or maintaining a straight trajectory based on a path prediction radius of the vehicle. In response to determining the vehicle is maintaining the straight trajectory, the one or more controllers determine a position and speed of the vulnerable road user based on the wireless signals. The one or more controllers calculate a relative heading angle between the vulnerable road user and the vehicle. The one or more controllers compare the relative heading angle with a lower limit threshold heading angle and an upper limit threshold heading angle. In response to determining the relative heading angle is greater than the lower limit threshold heading angle and less than the upper limit threshold heading angle, the one or more controllers determine a potential intersection exists between the vehicle and the vulnerable road user. In response to determining a potential intersection exists between the vehicle and the vulnerable road user, the one or more controllers compare a position of the vulnerable road user with a lateral distance threshold value and a stopping distance of the vehicle. In response to determining the position of the vulnerable road user intersects with the lateral distance threshold value and the stopping distance of the vehicle, the one or more controllers determine a conflict box. In response to determining a distance measured between the front of the vehicle and a closest side of the conflict box is less than the stopping distance of the vehicle, the one or more controllers determine potential imminent contact exists between the vulnerable road user and the vehicle. In response to determining the potential imminent contact exists between the vulnerable road user and the vehicle, the one or more controllers instruct an autonomous driving system to change a trajectory of the vehicle to avoid contacting the vulnerable road user.

In another aspect, the one or more controllers execute instructions to in response to determining the vehicle is making a turn, compare the position of the vulnerable road user with the lateral distance threshold value and the stopping distance of the vehicle, where the lateral distance threshold value is centered along a circular predicted path that the vehicle follows.

In yet another aspect, the one or more controllers execute instructions to in response to determining the stopping distance of the vehicle is less than or equal to the position of the vulnerable road user and the position of the vulnerable road user falls within the lateral distance threshold value centered along the circular predicted path, determine the potential imminent contact exists between the vulnerable road user and the vehicle.

In an aspect, the communication network is based on the V2X communication protocol.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
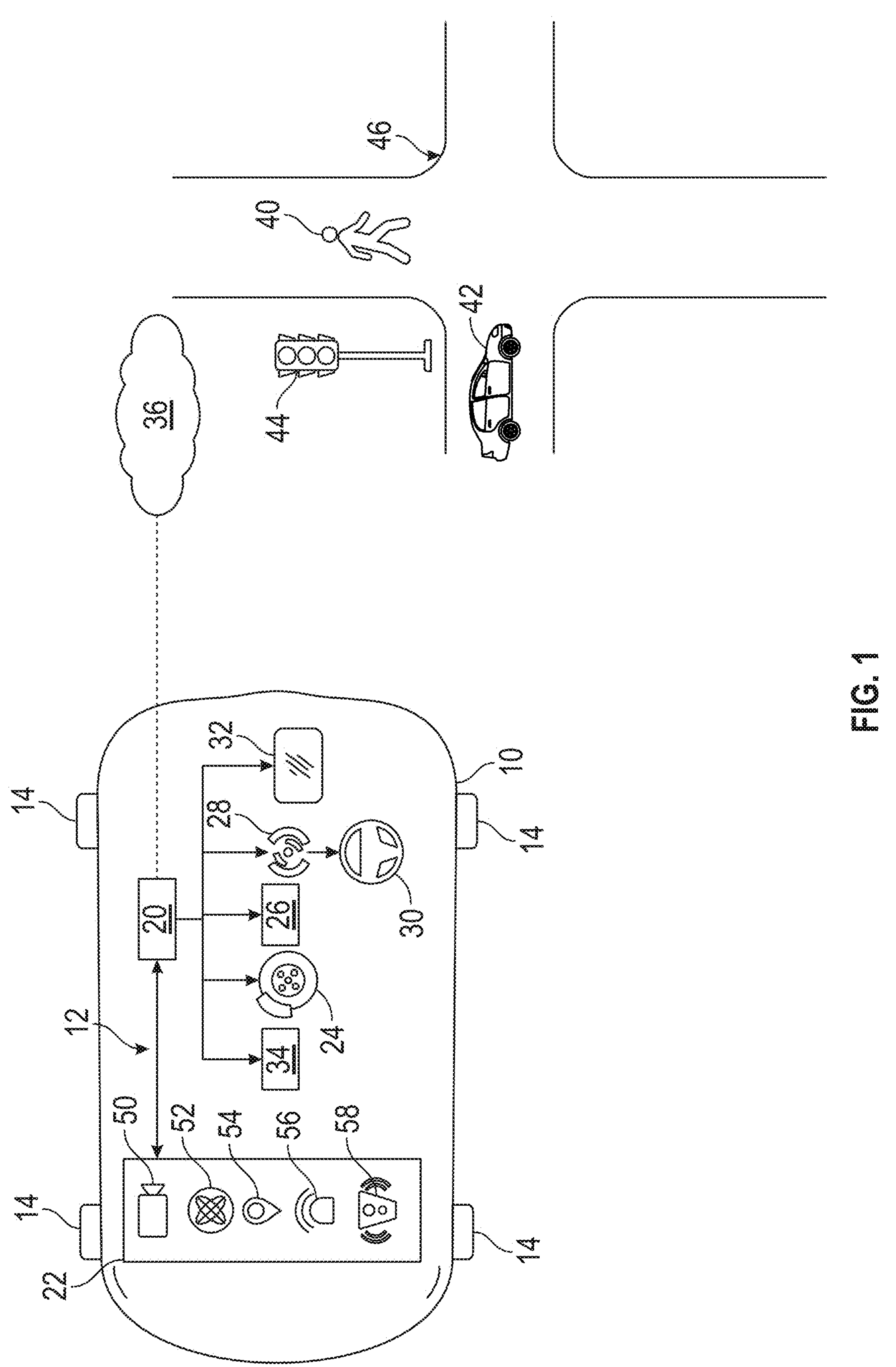
FIG. 1 illustrates a schematic diagram of vehicle including the disclosed vulnerable road user warning system including one or more controllers in wireless communication with a communication network, according to an exemplary embodiment.

Referring to FIG. 1, a vehicle 10 including the disclosed vulnerable road user warning system 12 is illustrated. It is to be appreciated that the vehicle 10 may be any type of vehicle such as, but not limited to, a sedan, a truck, sport utility vehicle, van, or motor home. In the non-limiting embodiment as shown in FIG. 1, the vehicle 10 includes one or more controllers 20 in electronic communication with a plurality of perception sensors 22, a braking system 24, an autonomous driving system 26, one or more haptic devices 28 that create haptic feedback upon a handwheel 30 of the vehicle 10, a display 32, and one or more systems 34 that are part of the vehicle 10. The one or more controllers 20 receive a plurality of sensor outputs from the one or more systems 34 that are part of the vehicle 10. The plurality of sensor inputs includes vehicle speed, yaw rate, vehicle position, and vehicle heading.

The one or more controllers 20 are also in wireless communication with a communication network 36. In one embodiment, the communication network 36 is based on the vehicle-to-everything (V2X) communication protocol and the wireless signals received from the communication network 36 include one or more personal safety messages (PSM), one or more sensor data sharing messages (SDSM), and one or more signal phase and timing and map data (SPAT/MAP) messages. However, it is to be appreciated that the communication network 36 is not limited to the V2X protocol and any other wireless communication protocol that indicates the position, speed, and trajectory of one or more vulnerable road users 40 located in the environment surrounding the vehicle 10 may be used as well. In addition to the vulnerable road users 40, in one embodiment the wireless signals may also indicate the position, speed, and trajectory of one or more vehicles 42 located in the environment surrounding the vehicle 10.

In some embodiments, the wireless messages from the communication network 36 may also include information regarding the traffic signal controllers 44 located in the environment surrounding the vehicle 10 and the geometric data regarding the intersection 46 where the traffic signal controller 44 is located. The information regarding the traffic signal controllers 44 may include the current phase of one or more traffic signal controllers 44 located in the environment surrounding the vehicle 10, the remaining time in the current phase, and the sequence of upcoming phases for each lane at the intersection where the traffic signal controller 44 is located. The geometric data regarding the intersection 46 where the traffic signal controller 44 is located includes, for example, lane connections, lane markings, and the location of the traffic signal controller 44.

The plurality of perception sensors 22 are each configured to collect perception data indicative of the environment surrounding the vehicle 10. In the non-limiting embodiment as shown in FIG. 1, the plurality of perception sensors 22 include one or more cameras 50, an inertial measurement unit (IMU) 52, a global positioning system (GPS) 54, radar 56, and LiDAR 58, however, it is to be appreciated that different or additional sensors may be used as well.

The braking system 24 includes a set of brakes corresponding to each wheel 14 of the vehicle 10. The autonomous driving system 26 may be part of a fully autonomous driving system such as an automated driving system (ADS) or, alternatively, a semi-autonomous driving system such an advanced driver assistance system (ADAS). The display 32 shows graphics and images that are visible to the driver of the vehicle 10 and may be, for example, a liquid crystal display (LCD). In one non-limiting embodiment, the display 32 is part of an infotainment system of the vehicle 10.

As explained below, the disclosed vulnerable road user warning system 12 determines potential imminent contact between a vulnerable road user 40 located in the surrounding environment and the vehicle 10 based on the wireless signals received from the communication network 36. In response to determining the potential imminent contact exists between the vulnerable road user 40 and the vehicle 10, the vulnerable road user warning system 12 may then instruct the vehicle 10 to execute one or more preventative actions to avoid contact between the vehicle 10 and the vulnerable road user 40. In one embodiment, the one or more preventative actions include generating a message upon the display 32 of the vehicle 10 informing one or more occupants of the vehicle 10 of the potential imminent contact. In another embodiment, the one or more preventative actions include engaging the braking system 24 to slow down or bring the vehicle 10 to a stop to avoid contact with the vulnerable road user 40. In yet another embodiment, the one or more preventative actions include creating an alert by instructing the one or more haptic devices 28 to create haptic feedback upon the handwheel 30. In still another embodiment, the one or more preventative actions include instructing the autonomous driving system 26 to change the trajectory of the vehicle 10 to avoid contacting the vulnerable road user 40.

Figure 2:
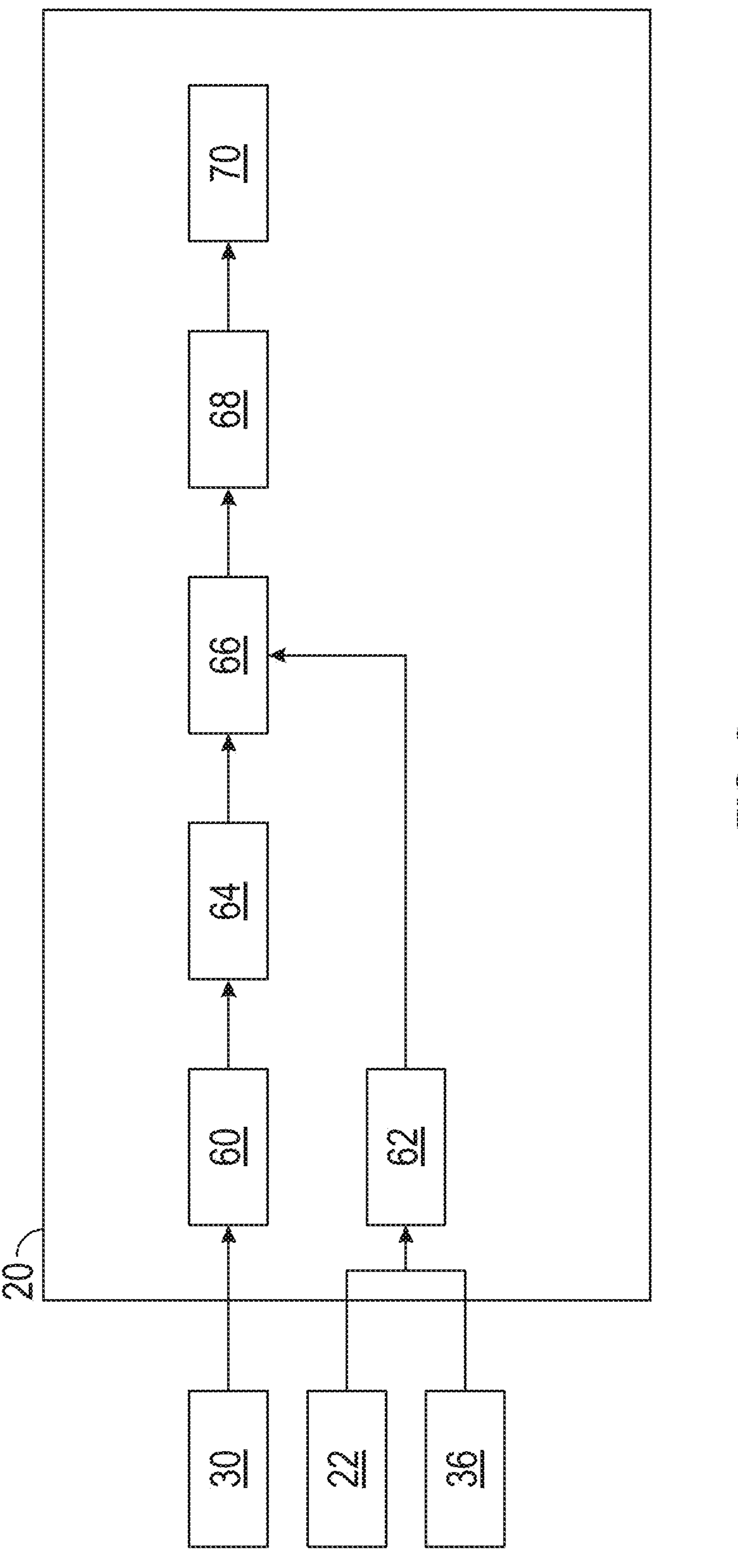
FIG. 2 is a block diagram illustrating the software architecture for the one or more controllers shown in FIG. 1, according to an exemplary embodiment.
Figure 3:
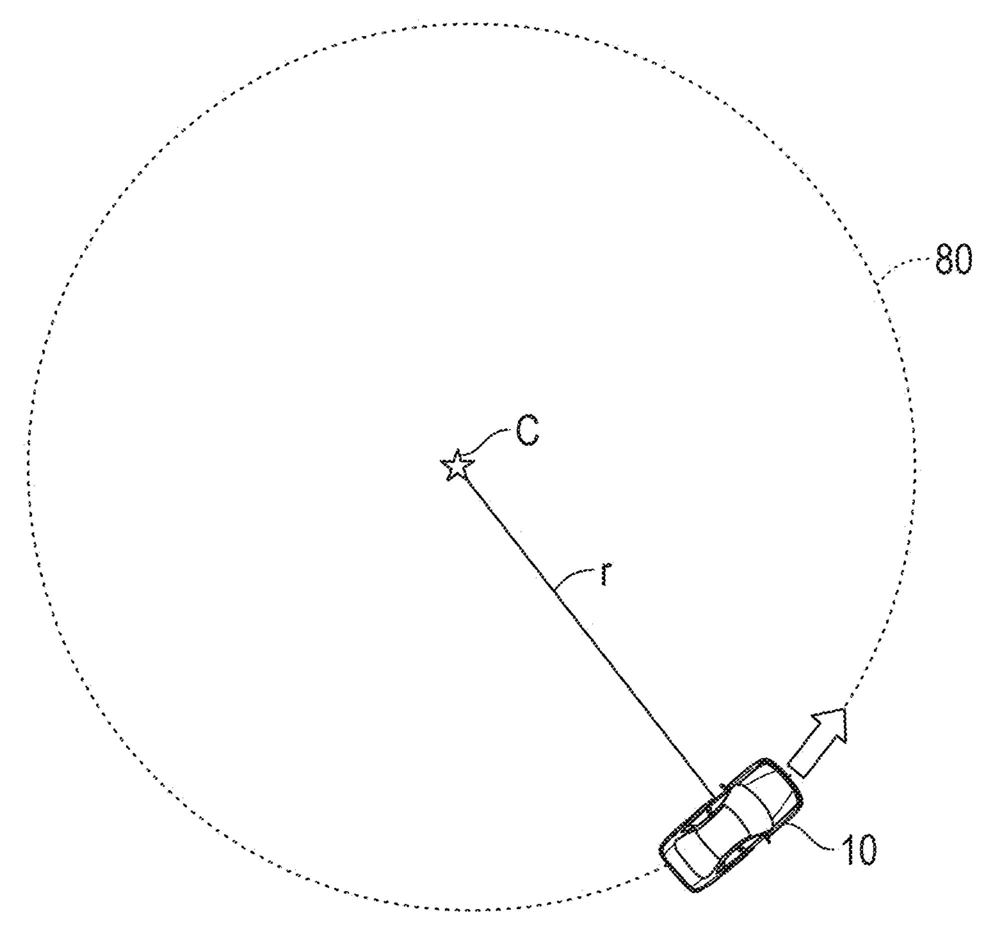
FIG. 3 is a diagram illustrating a path prediction radius that is created as the vehicle shown in FIG. 1 performs a turn, according to an exemplary embodiment.

FIG. 2 is a block diagram illustrating the software architecture for the one or more controllers 20 shown in FIG. 1. The one or more controllers 20 include a path prediction module 60, a coordinate generation module 62, a maneuver estimation module 64, a classification module 66, a conflict boxing module 68, and a traffic signal module 70. The path prediction module 60 of the one or more controllers 20 receives the vehicle speed and the yaw rate from the from the one or more systems 34 that are part of the vehicle 10 as input and determines a path prediction radius r of the vehicle 10 (shown in FIG. 3). FIG. 3 illustrates the vehicle 10 executing a turn, where the path prediction radius r is measured from a center C of a circular predicted path 80 that the vehicle 10 follows while executing a turn. The path prediction module 60 determines the path prediction radius r based on the vehicle speed and the yaw rate of the vehicle 10. Specifically, the path prediction radius r of the vehicle 10 is equal to the vehicle speed divided by the yaw rate (vehicle speed/yaw rate). It is to be appreciated that the path prediction radius r is indicative of the vehicle 10 either making a turn or maintaining a straight trajectory as well as the direction of the turn.

The coordinate generation module 62 of the one or more controllers 20 receives latitude and longitudinal coordinates indicating the position of the vehicle 10 and latitude and longitudinal coordinates indicating the position of a vulnerable road user 40 (FIG. 1) located in the environment surrounding the vehicle 10 as input, and determines the position of the vehicle 10 in Earth-centered, Earth-fixed (ECEF) coordinates and the position of the vulnerable road user 40 in east, north, up (ENU) coordinates. The position of the vulnerable road user 40 in ENU coordinates is then rotated in relation to the heading of the vehicle 10. It is to be appreciated that the latitude and longitudinal coordinates indicating the position of the vehicle 10 is determined based on the perception data collected by the plurality of perception sensors 22 (the IMU 52 and the GPS 54), and the latitude and longitudinal coordinates indicating the position of a vulnerable road user 40 may be determined based on the wireless signals from the communication network 36 (e.g., the one or more personal safety messages and the one or more sensor data sharing messages).

The maneuver estimation module 64 of the one or more controllers 20 receives the path prediction radius r of the vehicle 10 (shown in FIG. 3) determined by the path prediction module 60 as input. The maneuver estimation module 64 determines the vehicle 10 is either making a turn or maintaining a straight trajectory based on the path prediction radius r of the vehicle 10. Specifically, the maneuver estimation module 64 of the one or more controllers 20 compares an absolute value of the path prediction radius r of the vehicle 10 with a threshold radius value, where the threshold radius value is indicative of the vehicle 10 making a turn. If the path prediction radius r is less than the threshold radius value, the maneuver estimation module 64 of the one or more controllers 20 determines the vehicle 10 is making a turn. Otherwise, the maneuver estimation module 64 of the one or more controllers 20 determines the vehicle 10 is maintaining the straight trajectory.

In response to determining the vehicle 10 is making a turn, the maneuver estimation module 64 then determines the direction of the turn by comparing the path prediction radius r of the vehicle 10 with the value zero. In response to determining the path prediction radius r of the vehicle 10 is greater than zero, the maneuver estimation module 64 then determines the direction of the turn is right, otherwise the maneuver estimation module 64 then determines the direction of the turn is left.

The classification module 66 of the one or more controllers 20 receives an indication that the vehicle 10 is either maintaining a straight trajectory or making a turn from the maneuver estimation module 64, the position of the vehicle 10 in ECEF coordinates, the position of the vulnerable road user 40 in ENU coordinates, and the wireless signals from the communication network 36. In the present example, the maneuver estimation module 64 has determined the vehicle 10 is maintaining a straight trajectory. In response to determining the vehicle 10 is maintaining a straight trajectory, the classification module 66 may determine one or more attributes of the vulnerable road user 40 based on the one or more personal safety messages and the one or more sensor data sharing messages that are included in the wireless signals received from the communication network 36. The one or more attributes of vulnerable road user 40 include features such as, but not limited to, type of user (e.g., pedestrian, cyclist, etc.), speed, and position (i.e., a latitude and longitude of the vulnerable road user 40).

The classification module 66 of the one or more controllers 20 compares the speed of the vulnerable road user 40 with a threshold speed that is indicative the vulnerable road user 40 (FIG. 1) moving. For example, the threshold speed is selected to indicate the vulnerable road user 40 is performing activities such as walking or riding a bicycle. In other words, the threshold speed is selected to remove stationary vulnerable road users who may generate data indicating negligible movement that is created by noise in the data. It is to be appreciated that stationary vulnerable road users who are within a lateral threshold distance from the center of the vehicle 10 are not removed so as to consider individuals located directly in front of the vehicle 10. In embodiments, the lateral distance threshold is about four meters. In response to determining the vulnerable road user 40 is moving, the classification module 66 estimates the heading of the vulnerable road user 40 based on a change in the position (i.e., a change in the latitude and longitude) over time. In one non-limiting embodiment, the heading of the vulnerable road user 40 may be determined by a Kalman filter.

Figure 4:
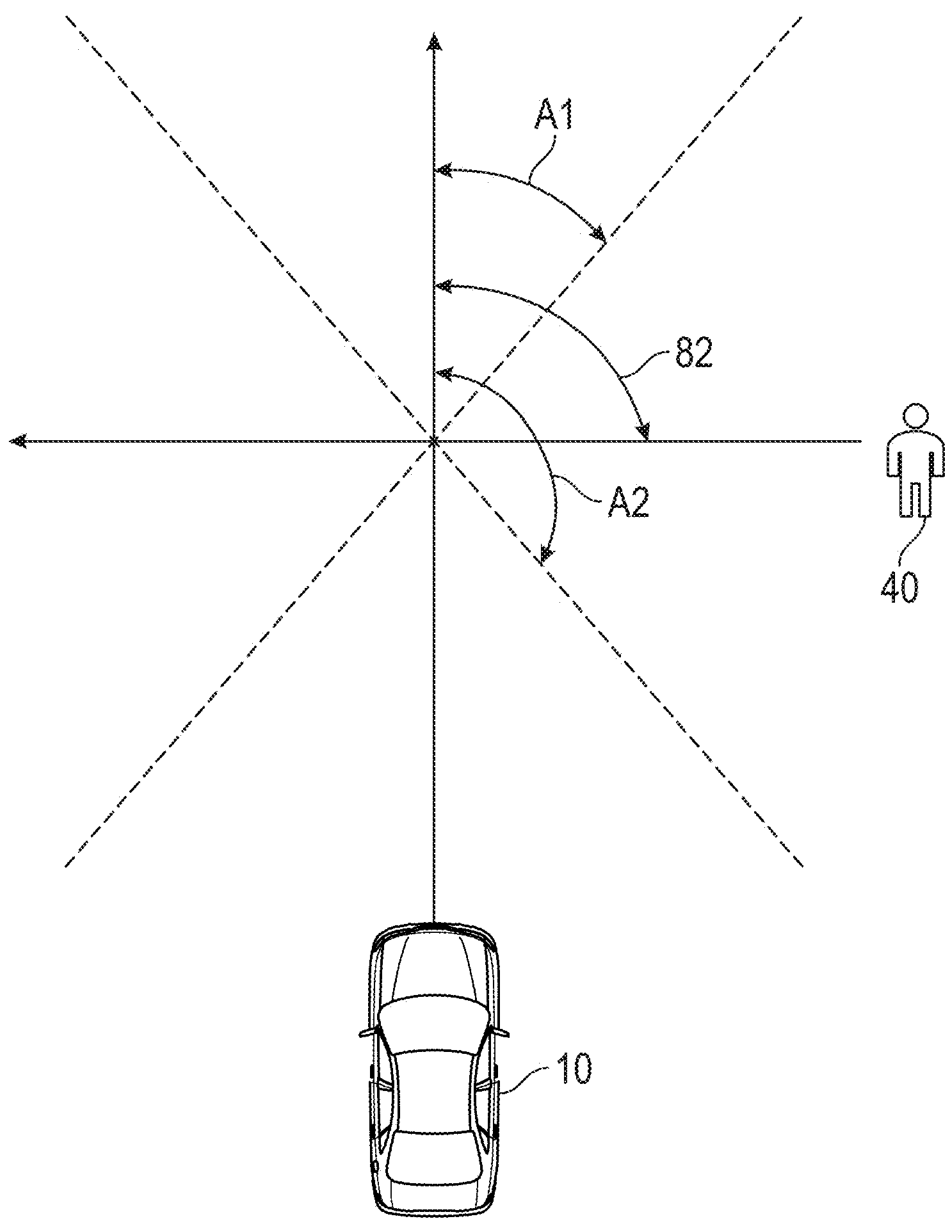
FIG. 4 is a diagram illustrating a relative heading angle that is measured between a vulnerable road user and the vehicle, a lower limit threshold angle, and an upper limit threshold angle, according to an exemplary embodiment.

The classification module 66 of the one or more controllers 20 then calculates a relative heading angle 82 (shown in FIG. 4) between the vulnerable road user 40 and the vehicle 10, where the relative heading angle 82 is determined based on the heading of the vehicle 10 and the heading of the vulnerable road user 40. The classification module 66 then compares the relative heading angle 82 with a lower limit threshold heading angle A1 and an upper limit threshold heading angle A2, which are both shown in FIG. 4. The lower limit threshold heading angle A1 and the upper limited threshold heading angle A2 are selected to capture an intersection between movement of the vehicle 10 and movement the vulnerable road user 40 and in embodiments is determined based on empirical data. In the non-limiting embodiment as shown in FIG. 4, the lower limit threshold heading angle A1 is about 35 degrees and the upper limit threshold heading angle A2 is about 135 degrees, however, it is to be appreciated that other values may be used as well.

In response to determining the relative heading angle 82 is greater than the lower limit threshold heading angle A1 and less than the upper limit threshold heading angle A2 (A1<relative heading angle 82<A2), the classification module 66 may determine a potential intersection between the vehicle 10 and the vulnerable road user 40 exists. Otherwise, the classification module 66 determines no potential intersection between the vehicle 10 and the vulnerable road user 40 exists, and the vulnerable road user warning system 12 may continue monitoring data received from the communication network 36.

Referring to FIGS. 1 and 2, as explained in detailed below, in response to determining a potential intersection exists between the vehicle 10 and the vulnerable road user 40, the classification module 66 of the one or more controllers 20 may then compare the position of the vulnerable road user 40 (which is determined based on the latitude and longitude) with a lateral distance threshold value L (shown in FIG. 5) and a stopping distance of the vehicle 10. The lateral distance threshold value L is indicative of the vulnerable road user 40 being positioned along the trajectory of the vehicle 10 in the lateral direction. In response to determining the lateral position of the vulnerable road user 40 intersects with the lateral distance threshold value L and the stopping distance of the vehicle 10, the conflict boxing module 68 may then calculate a conflict box 100 (FIG. 6), which is described below.

Figure 5:
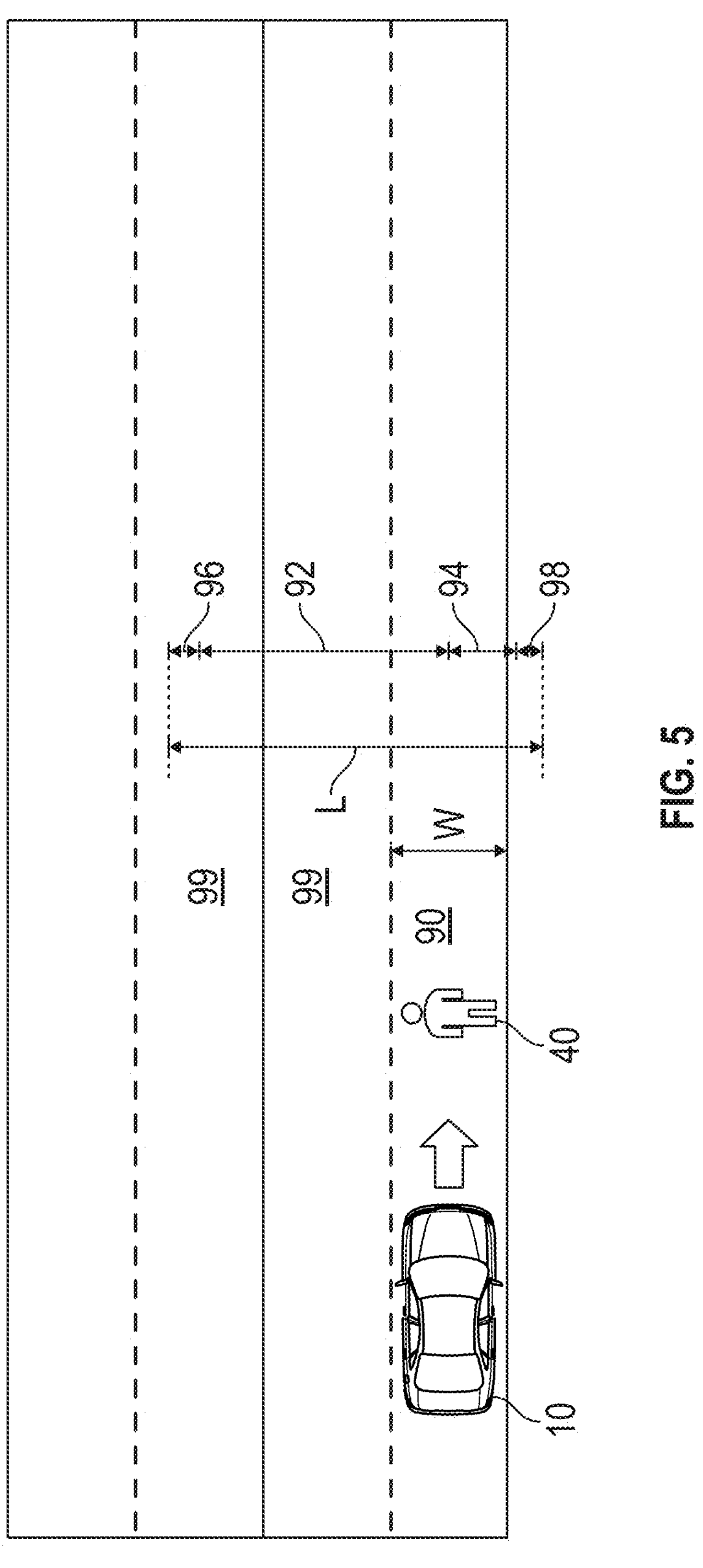
FIG. 5 is a diagram of a lane that the vehicle is presently traveling along, according to an exemplary embodiment.

Continuing to refer to FIGS. 1 and 2, the classification module 66 may then convert the latitude and longitude of the vulnerable road user 40 into an x-coordinate and a y-coordinate (VRU_X, VRU_Y) that are expressed based on the vehicle coordinate system. The classification module 66 then compares the y-coordinate of the vulnerable road user 40 with the lateral distance threshold value L. Referring to FIG. 5, the lateral distance threshold value L is indicative of the vulnerable road user 40 being positioned in front of and in the same lane 90 the vehicle 10 is traveling along.

The lateral distance threshold value L is the sum of a left lateral distance threshold 92, a right lateral distance threshold 94, a left width buffer distance 96, and a right width buffer distance 98. The left lateral distance threshold 92 is determined based on the lane width W of the lane 90 and a left lane multiplier, and the right lateral distance threshold 94 is determined based on the lane width W of the lane 90 and a right lane multiplier. Specifically, in one non-limiting embodiment, the left lateral distance threshold 92 is the lane width W multiplied by the left lane multiplier (W*left lane multiplier), and the right lateral distance threshold 94 is the lane width W multiplied by the right lane multiplier (W*right lane multiplier). As seen in FIG. 5, the left lateral distance threshold 92 is greater than the right lateral distance threshold 94 to accommodate oncoming lanes 99 located to the left of the vehicle 10. Merely by way of example, in one embodiment the left lane multiplier is about 2.0 and the right lane multiplier is 0.5.

Referring to FIGS. 1, 2, and 5, in response to determining the y-coordinate of the vulnerable road user 40 intersects with the lateral distance threshold value L, the classification module 66 determines the vulnerable road user 40 is not located along the trajectory of the vehicle 10 and is located either along a sidewalk or an adjacent lane of travel. Accordingly, the vulnerable road user warning system 12 may continue monitoring data received from the communication network 36. In response to determining the y-coordinate of the vulnerable road user 40 intersects with the lateral distance threshold value L, the classification module 66 determines the vulnerable road user 40 is located in front and in the same lane 90 as the vehicle 10. The classification module 66 may then compare the x-coordinate of the vulnerable road user 40 with the stopping distance of the vehicle 10. In response to determining the x-coordinate of the vulnerable road user 40 is less than or equal to the stopping distance of the vehicle 10, the classification module 66 determines the vulnerable road user 40 is not located along the trajectory of the vehicle 10. Accordingly, the vulnerable road user warning system 12 may continue monitoring data received from the communication network 36. In response to determining the x-coordinate of the vulnerable road user 40 is greater than the stopping distance of the vehicle 10, the conflict boxing module 68 may then determine the conflict box 100 (FIG. 6).

Figure 6:
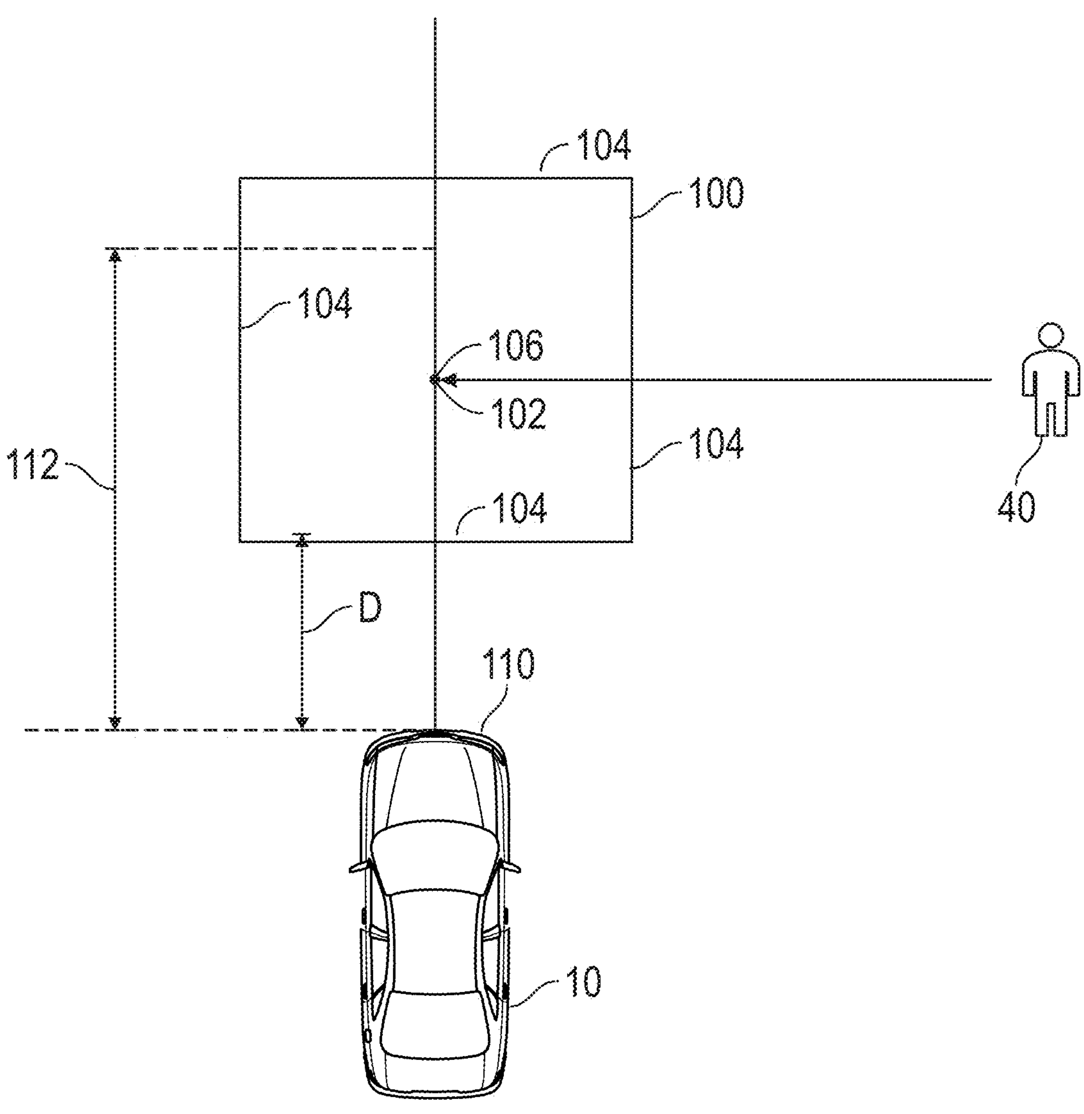
FIG. 6 is a diagram of a conflict box determined by the one or more controllers shown in FIG. 2, according to an exemplary embodiment.

Referring to both FIGS. 2 and 6, the conflict box 100 is determined based on a predicted point of intersection 102 between the vulnerable road user 40 and the vehicle 10. The predicted point of intersection 102 is calculated based on a predicted trajectory of the vehicle 10 and a predicted trajectory of the vulnerable road user 40. The predicted trajectory of the vehicle 10 is determined based on the speed, position, and heading of the vehicle 10 and the predicted trajectory of the vulnerable road user 40 is determined based on the speed, position, and heading of the vulnerable road user 40.

In the non-limiting embodiment as shown in FIG. 6, the conflict box 100 includes four sides 104 of equal length that create a square, where the predicted point of intersection 102 is located at a center 106 of the conflict box 100. Although FIG. 6 illustrates the conflict box 100 as a square, in another embodiment the longitudinal sides 104 of the conflict box 100 (i.e., the left and right sides 104) are lengthened as a function of the speed of the vehicle 10. Specifically, in one embodiment, the longitudinal sides 104 are lengthened based on the speed of the vehicle 10 multiplied by a vehicle-based buffer time, where the vehicle-based buffer time is a configurable parameter that is provided so as to provide extra time to execute one or more preventative actions to avoid contact between the vehicle 10 and the vulnerable road user 40. Similarly, in one non-limiting embodiment, the lateral sides 104 of the conflict box 100 (i.e., the top and bottom sides 104) are lengthened as a function of the speed of the vulnerable road user 40. Specifically, in one embodiment, the lateral sides 104 are lengthened based on the speed of the vulnerable road user 40 multiplied by a road user-based buffer time. Similar to the vehicle-based buffer time, the road-user based buffer time is a configurable parameter that is provided so as to provide extra time to execute one or more preventative actions to avoid contact between the vehicle 10 and the vulnerable road user 40.

Once the conflict box 100 is determined, the conflict boxing module 68 of the one or more controllers 20 may then compare a distance D measured between the front 110 of the vehicle 10 and the closest side 104 of the conflict box 100 with the stopping distance 112 of the vehicle 10. In response to determining the distance D measured between the front 110 of the vehicle 10 and the closest side 104 of the conflict box 100 is less than the stopping distance 112, the conflict boxing module 68 of the one or more controllers 20 determines the potential imminent contact exists between the vulnerable road user 40 and the vehicle 10. As mentioned above, the vulnerable road user warning system 12 may then execute one or more preventative actions to avoid contact between the vehicle 10 and the vulnerable road user 40. In response to determining the distance D measured between the front 110 of the vehicle 10 and the closest side 104 of the conflict box 100 is equal to or greater than the stopping distance 112, the conflict boxing module 68 of the one or more controllers 20 determines no potential imminent contact exists, and the vulnerable road user warning system 12 may continue to monitor the communication network 36.

Referring to FIG. 2, as mentioned above, the classification module 66 of the one or more controllers 20 receives an indication that the vehicle 10 is either maintaining a straight trajectory or making a turn from the maneuver estimation module 64. In the present example, the maneuver estimation module 64 has determined the vehicle 10 is making a turn. In some embodiments, the classification module 66 may also confirm the vehicle 10 is making a turn by receiving a signal indicating the turn signal is activated or a signal indicating a handwheel angle exceeds a threshold value. The turn signal or the handwheel angle may be used so as to confirm that the vehicle 10 is not simply changing lanes instead of making a turn.

Figure 7:
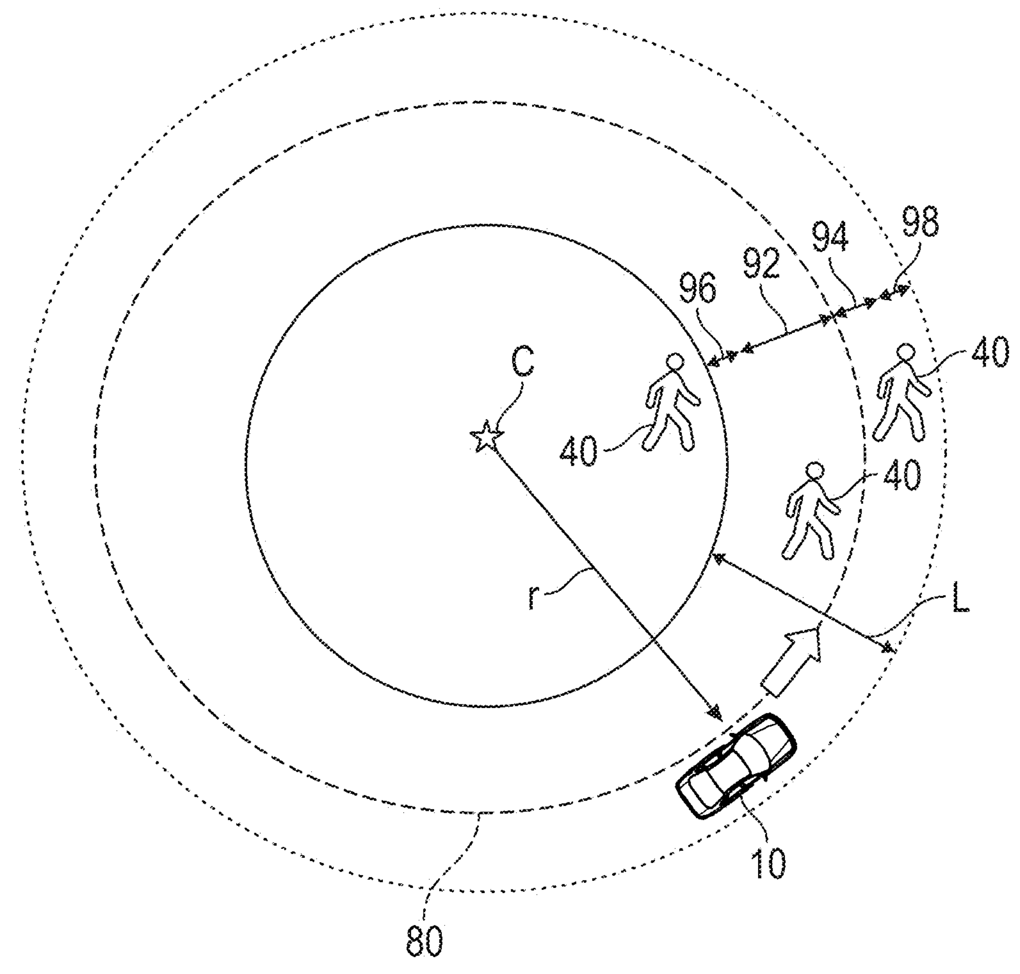
FIG. 7 is a diagram of the path prediction radius shown in FIG. 3 including lateral distance threshold values, according to an exemplary embodiment.

In response to determining the vehicle 10 is making a turn, the classification module 66 of the one or more controllers 20 may compare the position of the vulnerable road user 40 (which is determined based on the latitude and longitude) with the lateral distance threshold value L and a stopping distance of the vehicle 10, where the lateral distance threshold value L is centered along the circular predicted path 80 that the vehicle 10 follows (shown in FIG. 7). Specifically, the classification module 66 of the one or more controllers 20 may then compare the x-coordinate of the vulnerable road user 40 with the stopping distance of the vehicle 10. In response to determining stopping distance of the vehicle 10 is greater than the x-coordinate of the vulnerable road user 40, the classification module 66 determines the vulnerable road user 40 is not located along the trajectory of the vehicle 10. Accordingly, the vulnerable road user warning system 12 may continue monitoring data received from the communication network 36.

FIG. 7 is a diagram of the path prediction radius r shown in FIG. 3, where the lateral distance threshold value L is centered along the circular predicted path 80 that the vehicle 10 follows, where the left lateral distance threshold 92 and the left width buffer distance 96 are located to the left of the circular predicted path 80 and the right lateral distance threshold 94 and the right width buffer distance 98 are located to the right of the circular predicted path 80. In response to determining stopping distance of the vehicle 10 is less than or equal to the x-coordinate of the vulnerable road user 40, the classification module 66 of the one or more controllers 20 may then compare the y-coordinate of the vulnerable road user 40 with the lateral distance threshold value L that is centered along the circular predicted path 80 of the vehicle 10. In response to determining the y-coordinate of the vulnerable road user 40 falls outside the lateral distance threshold value L centered along the circular predicted path 80, the classification module 66 determines the vulnerable road user 40 is not located along the trajectory of the vehicle 10. Accordingly, the vulnerable road user warning system 12 may continue monitoring data received from the communication network 36.

In response to determining the y-coordinate of the vulnerable road user 40 falls within the lateral distance threshold value L centered along the circular predicted path 80, the classification module 66 determines the potential imminent contact exists between the vulnerable road user 40 and the vehicle 10. In other words, in response to determining the stopping distance of the vehicle 10 is less than or equal to the position of the vulnerable road user 40 and the position of the vulnerable road user 40 falls within the lateral distance threshold value L centered along the circular predicted path 80, the classification module 66 determines the potential imminent contact exists between the vulnerable road user 40 and the vehicle 10. As mentioned above, the vulnerable road user warning system 12 may then execute one or more preventative actions to avoid contact between the vehicle 10 and the vulnerable road user 40.

Figure 8:
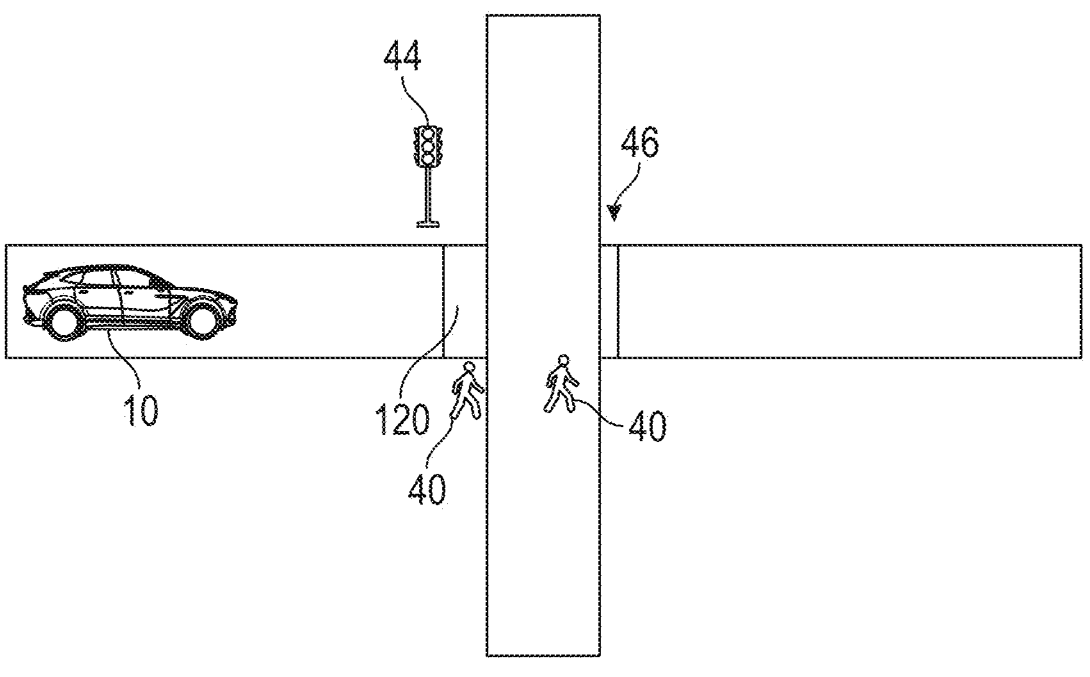
FIG. 8 is a diagram of an immediate intersection in the environment surrounding the vehicle, according to an exemplary embodiment.

Referring to FIGS. 2 and 8, in embodiments the traffic signal module 70 of the one or more controllers 20 may instruct the autonomous driving system 26 (FIG. 1) to delay launching the vehicle 10 from a stop at an immediate intersection 46 where a traffic signal controller 44 is located based on one or more signal phase and timing and map data (SPAT/MAP) messages that are part of the wireless signals received from the communication network 36 (FIG. 1). In embodiments where the vehicle 10 includes a start-stop engine, the traffic signal module 70 of the one or more controllers 20 may also instruct the start-stop engine to delay the automatic start based on the SPAT/MAP messages as well. Furthermore, in embodiments the one or more controllers 20 may also instruct the display 32 to generate a warning message indicating the presence of a vulnerable road user 40 located in an immediate crosswalk 120 of an immediate intersection 46 where the vehicle 10 is stopped.

Although SPAT/MAP messages are described, it is to be appreciated that any other wireless communication protocol that indicates information regarding the traffic signal controllers 44 and the geometric data regarding the intersection 46 where the traffic signal controller 44 is located may be used as well. Specifically, the traffic signal module 70 of the one or more controllers 20 may determine the current lane of travel of the vehicle 10 as well as identify the immediate crosswalk 120 of the immediate intersection 46 where the vehicle 10 is stopped based on the wireless signals. The one or more controllers 20 also determine the presence and location of the vulnerable road user 40 along the crosswalk 120 based on the wireless signals from the communication network 36 indicating a location, speed, and trajectory of a vulnerable road user 40.

In response to determining the vulnerable road user 40 is located along the immediate intersection 46 where a traffic signal controller 44, the traffic signal module 70 then determines when the vulnerable road user 40 enters and exits the immediate crosswalk 120 along the immediate intersection 46 where the vehicle 10 is stopped. The traffic signal module 70 of the one or more controllers 20 may then instruct the autonomous driving system 26 to delay launching the vehicle 10 from a stop at an immediate intersection 46 where the traffic signal controller 44 is located based on when the vulnerable road user 40 enters and exits the immediate crosswalk 120. In embodiments, the traffic signal module 70 of the one or more controllers 20 may also instruct the start-stop engine to delay the automatic start based on when the vulnerable road user 40 enters and exits the immediate crosswalk 120.

Referring generally to the figures, the disclosed vulnerable road user warning system provides various technical effects and benefits. It is to be appreciated that sometimes a vehicle's perception sensors may be unable to detect vulnerable road users in the surrounding environment due to a variety of reasons such as, for example, reduced visibility, an obstructed line-of-sight, or a limited field-of-view of the perception sensors. The vulnerable road user warning system provides an alternative approach for detecting and classifying the location of a vulnerable road user with respect to a vehicle based on the wireless signals received from the communication network instead of relying upon perception data. The vulnerable road user warning system also instructs the vehicle to execute one or more preventative actions to avoid contact between the vehicle and the vulnerable road user in response to determining potential imminent contact exists between the vulnerable road user and the vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vulnerable road user warning system for a vehicle, the vulnerable road user warning system comprising:

one or more controllers that receives wireless signals from a communication network indicating a location, speed, and trajectory of a vulnerable road user located in an environment surrounding the vehicle, and wherein the one or more controllers include one or more processors that execute instructions to:

determine the vehicle is either making a turn or maintaining a straight trajectory based on a path prediction radius of the vehicle;

in response to determining the vehicle is maintaining the straight trajectory, determine a position and speed of the vulnerable road user based on the wireless signals;

calculate a relative heading angle between the vulnerable road user and the vehicle;

compare the relative heading angle with a lower limit threshold heading angle and an upper limit threshold heading angle;

in response to determining the relative heading angle is greater than the lower limit threshold heading angle and less than the upper limit threshold heading angle, determine a potential intersection exists between the vehicle and the vulnerable road user;

in response to determining a potential intersection exists between the vehicle and the vulnerable road user, compare a position of the vulnerable road user with a lateral distance threshold value and a stopping distance of the vehicle;

in response to determining the position of the vulnerable road user intersects with the lateral distance threshold value and the stopping distance of the vehicle, determine a conflict box;

in response to determining a distance measured between the front of the vehicle and a closest side of the conflict box is less than the stopping distance of the vehicle, determine potential imminent contact exists between the vulnerable road user and the vehicle; and in response to determining the potential imminent contact exists between the vulnerable road user and the vehicle, instruct the vehicle to execute one or more preventative actions to avoid contact between the vehicle and the vulnerable road user.

2. The vulnerable road user warning system of claim 1, wherein the one or more preventative actions include instructing an autonomous driving system to change a trajectory of the vehicle to avoid contacting the vulnerable road user.

3. The vulnerable road user warning system of claim 1, wherein the conflict box is determined based on a predicted point of intersection between the vulnerable road user and the vehicle.

4. The vulnerable road user warning system of claim 3, wherein the predicted point of intersection is calculated based on a predicted trajectory of the vehicle and a predicted trajectory of the vulnerable user.

5. The vulnerable road user warning system of claim 3, wherein the conflict box includes four sides of equal length that create a square, and wherein the predicted point of intersection is located at a center of the conflict box.

6. The vulnerable road user warning system of claim 5, wherein longitudinal sides of the conflict box are lengthened as a function of the speed of the vehicle.

7. The vulnerable road user warning system of claim 5, wherein lateral sides of the conflict box are lengthened as a function of the speed of the vulnerable road user.

8. The vulnerable road user warning system of claim 1, wherein the lateral distance threshold value is the sum of a left lateral distance threshold, a right lateral distance threshold, a left width buffer distance, and a right width buffer distance.

9. The vulnerable road user warning system of claim 8, wherein the left lateral distance threshold is determined based on a lane width of a lane the vehicle is traveling along and a left lane multiplier, and the right lateral distance threshold is determined based on the lane width of the lane and a right lane multiplier.

10. The vulnerable road user warning system of claim 9, wherein the left lateral distance threshold is greater than the right lateral distance threshold.

11. The vulnerable road user warning system of claim 1, wherein the path prediction radius is measured from a center of a circular predicted path that the vehicle follows while executing the turn.

12. The vulnerable road user warning system of claim 11, wherein the one or more controllers execute instructions to:

in response to determining the vehicle is making a turn, compare the position of the vulnerable road user with the lateral distance threshold value and the stopping distance of the vehicle, wherein the lateral distance threshold value is centered along the circular predicted path that the vehicle follows.

13. The vulnerable road user warning system of claim 12, wherein the one or more controllers execute instructions to:

in response to determining the stopping distance of the vehicle is less than or equal to the position of the vulnerable road user and the position of the vulnerable road user falls within the lateral distance threshold value centered along the circular predicted path, determine the potential imminent contact exists between the vulnerable road user and the vehicle.

14. The vulnerable road user warning system of claim 1, wherein the one or more controllers execute instructions to:

instruct an autonomous driving system to delay launching the vehicle from a stop at an immediate intersection where a traffic signal controller is located based on the wireless signals received from the communication network, wherein the wireless signals include information regarding the traffic signal controller and geometric data regarding an intersection where the traffic signal controller is located that are part of.

15. The vulnerable road user warning system of claim 1, wherein the communication network is based on the vehicle-to-everything (V2X) communication protocol.

16. A method for determining potential imminent contact between a vulnerable road user and a vehicle, the method comprising:

determining, by one or more controllers, the vehicle is either making a turn or maintaining a straight trajectory based on a path prediction radius of the vehicle, wherein the one or more controllers receive wireless signals from a communication network indicating a location, speed, and trajectory of a vulnerable road user located in an environment surrounding the vehicle;

in response to determining the vehicle is maintaining the straight trajectory, determining a position and speed of the vulnerable road user based on the wireless signals;

calculating a relative heading angle between the vulnerable road user and the vehicle;

comparing the relative heading angle with a lower limit threshold heading angle and an upper limit threshold heading angle;

in response to determining the relative heading angle is greater than the lower limit threshold heading angle and less than the upper limit threshold heading angle, determining a potential intersection exists between the vehicle and the vulnerable road user;

in response to determining a potential intersection exists between the vehicle and the vulnerable road user, comparing a position of the vulnerable road user with a lateral distance threshold value and a stopping distance of the vehicle;

in response to determining the position of the vulnerable road user intersects with the lateral distance threshold value and the stopping distance of the vehicle, determining a conflict box;

in response to determining a distance measured between the front of the vehicle and a closest side of the conflict box is less than the stopping distance of the vehicle, determining the potential imminent contact exists between the vulnerable road user and the vehicle; and in response to determining the potential imminent contact exists between the vulnerable road user and the vehicle, instructing the vehicle to execute one or more preventative actions to avoid contact between the vehicle and the vulnerable road user.

17. A vulnerable road user warning system for a vehicle, the vulnerable road user warning system comprising:

one or more controllers that receives wireless signals from a communication network indicating a location, speed, and trajectory of a vulnerable road user located in an environment surrounding the vehicle, and wherein the one or more controllers include one or more processors that execute instructions to:

determine the vehicle is either making a turn or maintaining a straight trajectory based on a path prediction radius of the vehicle;

in response to determining the vehicle is maintaining the straight trajectory, determine a position and speed of the vulnerable road user based on the wireless signals;

calculate a relative heading angle between the vulnerable road user and the vehicle;

compare the relative heading angle with a lower limit threshold heading angle and an upper limit threshold heading angle;

in response to determining the relative heading angle is greater than the lower limit threshold heading angle and less than the upper limit threshold heading angle, determine a potential intersection exists between the vehicle and the vulnerable road user;

in response to determining a potential intersection exists between the vehicle and the vulnerable road user, compare a position of the vulnerable road user with a lateral distance threshold value and a stopping distance of the vehicle;

in response to determining the position of the vulnerable road user intersects with the lateral distance threshold value and the stopping distance of the vehicle, determine a conflict box;

in response to determining a distance measured between the front of the vehicle and a closest side of the conflict box is less than the stopping distance of the vehicle, determine potential imminent contact exists between the vulnerable road user and the vehicle; and in response to determining the potential imminent contact exists between the vulnerable road user and the vehicle, instruct an autonomous driving system to change a trajectory of the vehicle to avoid contacting the vulnerable road user.

18. The vulnerable road user warning system of claim 17, wherein the one or more controllers execute instructions to:

in response to determining the vehicle is making a turn, compare the position of the vulnerable road user with the lateral distance threshold value and the stopping distance of the vehicle, wherein the lateral distance threshold value is centered along a circular predicted path that the vehicle follows.

19. The vulnerable road user warning system of claim 18, wherein the one or more controllers execute instructions to:

in response to determining the stopping distance of the vehicle is less than or equal to the position of the vulnerable road user and the position of the vulnerable road user falls within the lateral distance threshold value centered along the circular predicted path, determine the potential imminent contact exists between the vulnerable road user and the vehicle.

20. The vulnerable road user warning system of claim 17, wherein the communication network is based on the V2X communication protocol.

* * * * *